(12) United States Patent
De et al.

(10) Patent No.: US 8,489,530 B2
(45) Date of Patent: Jul. 16, 2013

(54) SYSTEM AND METHOD FOR ROOT CAUSE ANALYSIS OF THE FAILURE OF A MANUFACTURED PRODUCT

(75) Inventors: Sudripto De, Munirka (IN); Srinivas Narasimhamurthy, Bangalore (IN); Ashish Sureka, New Delhi (IN); Satyabrata Pradhan, Sundargarh (IN)

(73) Assignee: Infosys Limited (IN)

( * ) Notice: Subject to any disclaimer, the term of this patent is extended or adjusted under 35 U.S.C. 154(b) by 1173 days.

(21) Appl. No.: 12/315,497

(22) Filed: Dec. 3, 2008

(65) Prior Publication Data

US 2009/0150325 A1    Jun. 11, 2009

(30) Foreign Application Priority Data

Dec. 3, 2007 (IN) ............................ 2868/CHE/2007

(51) Int. Cl.
*G06F 17/00* (2006.01)
*G06F 7/60* (2006.01)
*G06F 11/00* (2006.01)

(52) U.S. Cl.
USPC .................................. 706/45; 703/2; 714/100

(58) Field of Classification Search
None
See application file for complete search history.

(56) References Cited

U.S. PATENT DOCUMENTS

| 6,243,628 | B1 * | 6/2001 | Bliley et al. | 701/29.4 |
| 6,553,548 | B1 * | 4/2003 | Hekmatpour | 716/106 |
| 6,584,455 | B1 * | 6/2003 | Hekmatpour | 706/45 |
| 2003/0018600 | A1 * | 1/2003 | Jammu | 706/16 |
| 2004/0250166 | A1 * | 12/2004 | Dahlquist et al. | 714/37 |
| 2005/0071217 | A1 * | 3/2005 | Hoogs et al. | 705/10 |

* cited by examiner

*Primary Examiner* — Alan Chen
(74) *Attorney, Agent, or Firm* — Lerner, David, Littenberg, Krumholz & Mentlik, LLP

(57) ABSTRACT

A system, method and computer program product for the root cause analysis of the failure of a manufactured product is disclosed. The present invention includes the development of a knowledge model, based on information obtained from historical warranty claim forms and various manufacturing data sources. The invention also includes processing text information in a free-form text that is obtained from warranty claim forms by using text-tagging and annotation techniques. Thereafter, the knowledge model is converted to a Bayesian network. The present invention provides a user interface to select parameters and corresponding instances from current warranty claim forms. The selected parameters and corresponding instances are used as input evidence for the Bayesian network. The present invention facilitates the process of drawing inferences for root cause analysis of the failure of manufactured products and corresponding probabilities.

21 Claims, 11 Drawing Sheets

SYSTEM AND METHOD FOR ROOT CAUSE ANALYSIS OF THE FAILURE OF A MANUFACTURED PRODUCT

BACKGROUND OF THE INVENTION

The present invention generally relates to root cause analysis. More specifically, the present invention relates to a system and method for root cause analysis of the failure of a manufactured product.

There has been an increase in the failure of manufactured products on the shop floor and in the field. The main reason for this is the growth in sales volumes due to the ever-rising demand for manufactured products, the increase in the complexity of the manufactured products due to the increasing expectations of customers, and the extent of product design re-use for the faster introduction of more and more products in the market. With reference to the automotive industry, rising warranty expenses have become a big concern and manufacturers have come to realize that warranty expenses should not be categorized as 'cost of doing business'; that they need to address the problem at its roots by improving product quality, boosting repair performance, and ensuring standardized warranty quality processes.

Therefore, there is a need to detect failure patterns that result in defects in manufactured products, on the shop floor and in the field, with speed and accuracy. However, to detect problems, manufacturers mainly rely on feedback from customers. These customers are the user departments in the case of in-house problems, failure or defects; and end user customers and/or after-sales service partners for problems, failures or defects in the field.

Common sources of data include manufacturing process data, product data, reliability and testing data, parts supply data, failure data, enterprise financial data, supplier enterprise data, dealer and channel enterprise data, sales data, and customer data. A part of this data is structured, that is, it is available in pre-defined format and schema, such as the Product Identification Number, the Supplier Identification Code, the Manufacturing Batch Code, the Warranty Claim Identification Number, the Service Centre Identification Code, the Failure Defect Code, the date of occurrence, the date of resolution, the number of failures, the cost of failures, etc. However, a large part of this data is unstructured and is available in the form of free-form text or natural language text such as customers' comments (or the voice of customers), technicians' comments (or diagnostic observations), resolution action details, inspector's observations on check sheets, etc.

Over the past several years, various enterprises have developed advanced systems for analyzing structured data through Relational Database Management Systems (RDMBS), data warehousing and other structured data-mining techniques. With structured data analysis, it is possible to carry out a comprehensive analysis by efficient slice-and-dice of the data, based on a multi-dimensional analysis. However, structured data analysis does not provide sufficient depth to the analysis because of the limited number of structured data parameters or fields in the structured database. This limitation is due to the fact that as the number of structured parameters increases, it becomes more and more cumbersome for data-entry personnel to manually select the correct codes from the long list of options for each field in the structured database. This is not only time-consuming but also prone to errors. Even if the fields are comprehensive, the number of options for filling data in the fields through drop-down menus is limited. Moreover, data-entry operation is allotted the least cost in the value chain of warranty management operation, and there is a general tendency to enter either repeated or generic codes in any long list of available codes, which dilutes the depth of the feedback captured in the structured data.

A substantial portion of the data is in unstructured form, such as free-form text (sentences, messages, comments etc.). According to various market study reports, more than 75 percent of data related to the manufacturing industry is unstructured. To draw meaningful inferences from the vast quantity of text data, highly-skilled specialists can manually analyze the data and draw conclusions to indicate the root cause of failures in manufactured products. However, this is not only extremely time-consuming and error-prone but also very costly. Therefore, most analysis overlooks this information to avoid the additional cost. As a result, the vast potential of a rich source of failure information residing in the text fields remains untapped. This has a negative impact on the data analysis of failure reports. One of the most critical aspects of this negative impact is the delay in the detection of the actual cause for failure in the field. Another important impact is on the quality and accuracy of analysis. As the structured data primarily does not reflect the granular details of the failure, the data analysis remains less accurate and erroneous.

Another major limitation is the lack of close-knit integration of the manufacturing data residing on the shop floor and the field-failure data residing with the customer service or marketing departments. This hampers the process of setting up logical links between manufacturing events and corresponding failures in the field. Even if such links are planned, implementation takes a very long time. Most warranty failures are not analyzed in depth due to the scarcity of time for establishing these correlations. Thus, accountability for each failure in the field is not properly established and corrective action to improve product quality take a long time.

Presently, enterprises mainly rely on only a few gifted individuals, who have the expertise to 'sense' the data and extract the root causes of failure. The process is primarily manual and is not standardized; and the knowledge is based on individuals. Therefore, this approach is highly person-dependent and non-standardized, and therefore, prone to inherent inefficiencies. The lack of a standardized process prevents any systematic plan of action to improve product quality, and thereby, reduces the occurrence of failures. Moreover, the loss of these gifted individuals due to attrition or superannuation results in their knowledge being lost by the enterprise.

In light of the foregoing facts, there is a need for improved techniques for capturing and analyzing structured and unstructured information relating to the failure of manufactured products. In addition, the improved technique should provide a standardized system for leveraging knowledge, to arrive at accurate inferences with regard to the root causes of failures in manufactured products.

BRIEF SUMMARY OF THE INVENTION

An object of the present invention is to provide a system and method for root cause analysis of a manufactured product.

Another object of the present invention is to process structured and unstructured data related to field failure and manufacturing information, to generate a set of field failure attributes and a set of manufacturing attributes of the manufactured product.

Another object of the present invention is to develop a knowledge model, with the knowledge model being an ontology comprising information related to the set of field failure attributes and the set of manufacturing attributes of the manufactured product.

Another object of the present invention is to convert the knowledge model into a Bayesian network, the Bayesian network comprising one or more nodes, with each node representing an entity of the knowledge model along with a corresponding conditional probability of the occurrence of the entity.

Another object of the present invention is to provide a system and method for generating inferences with respect to the root cause of the failure of manufactured product based on one or more parameters and corresponding instances related to the set of field-failure attributes selected through multi-parameter drill-through and parameter-recall-and-display techniques.

Accordingly, the present invention provides a system and method for automating structured and unstructured data analysis, integrating field-failure information and manufacturing information into a knowledge model, converting the knowledge model into a Bayesian network, and standardizing the process of drawing inferences for the root cause of failures.

The present invention includes processing structured and unstructured data present in historical records that are related to field-failure and manufacturing attributes in the enterprise and in external sources. The structured data is present in predefined formats and may be processed, based on pre-defined schemas. The unstructured data is present in the form of free-form text or natural language text. The unstructured information is semantically parsed into named entities, in accordance with natural language-processing techniques such as text-tagging and the annotation technique. The structured and unstructured data is used to develop the knowledge model. The knowledge model is an ontology of entities related to the field-failure attributes and the manufacturing attributes that are connected in a cause-and-effect relationship. Each entity in the knowledge model represents an instance of a parameter that is related to one of the field-failure and manufacturing attributes. The knowledge model is converted into the Bayesian network, wherein each node of the Bayesian Network depicts an entity of the knowledge model. Further, each node of the Bayesian Network has an objective value attribute that denotes the probability of occurrence of the instance based on the frequency of occurrence of a particular type of failure computed, on the basis of historical data and the opinion of industry experts. The learning of the knowledge model and its conversion to the Bayesian network is carried out regularly with updated data records and information.

The structured and unstructured data in the current records is processed by the same techniques as those used to process the historical records. One or more parameters, and the corresponding instances related to field failure, are selected through multi-parameter drill-through and parameter-recall-and-display techniques. The selected parameters and the corresponding instances are stored in a filter repository and then provided as input evidence to the Bayesian network for root-cause analysis.

The present invention determines a unique relationship between the input evidence and the nodes of the Bayesian network by using a multiple-array mapping technique. Once the unique relationship is established, the input evidence is used to draw inferences, based on probabilistic reasoning. These inferences include each probable root cause(s) of failure with the corresponding probability of occurrence. The present invention enables drawing of inferences in a stage-wise manner, wherein at each stage an analyst can use his judgment to arrive at a final inference.

Therefore, the present invention provides a standardized system for leveraging knowledge to arrive at accurate inferences with regard to the root causes of the failure of manufactured products. Further, the present invention provides improved techniques for capturing and analyzing structured and unstructured information related to the failure of manufactured products. The dependency on non-standardized and individual-based methods for root cause analysis is eliminated, and detection of the root cause of failure becomes much faster and more accurate.

DETAILED DESCRIPTION

The invention provides a system, method and computer program product for the root cause analysis of the failure of a manufactured product. This root cause analysis is carried out to determine the probable cause that resulted in the failure of the manufactured product. The identification of the root causes of the failure is integral for improving the overall product quality, which results in the reduced occurrence of failure, and thereby, reduced warranty costs borne by manufacturers.

Figure 1:
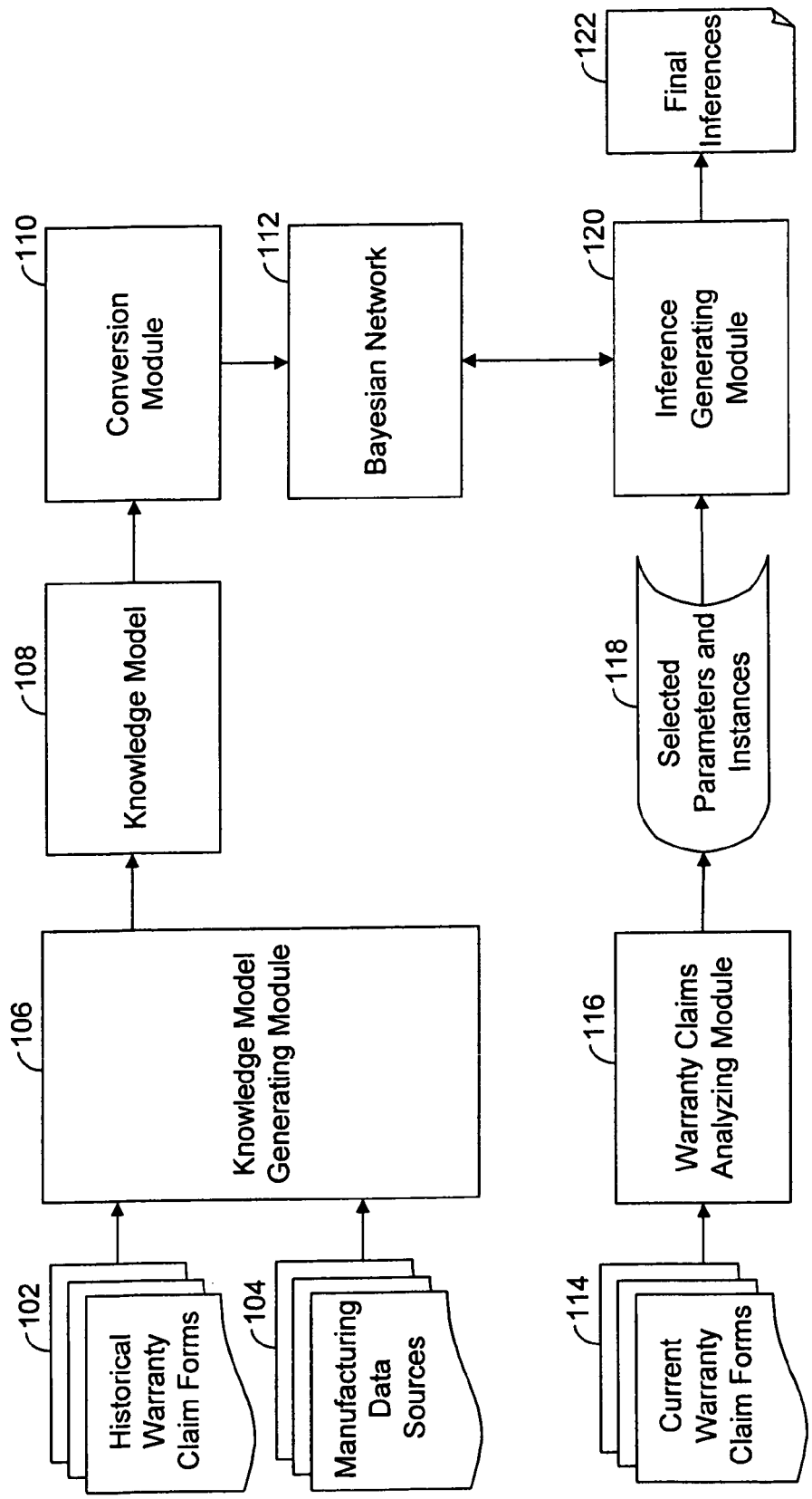
FIG. 1 is a block diagram depicting a system for root cause analysis of the failure of a manufactured product, in accordance with various embodiments of the present invention.

FIG. 1 is a block diagram depicting a system 100 for root cause analysis of the failure of a manufactured product, in accordance with various embodiments of the present invention.

System 100 comprises a knowledge model generating module 106, a knowledge model 108, a conversion module 110, a Bayesian network 112, a warranty claims analyzing module 116, and an inference generating module 120. FIG. 1 also depicts data inputs and outputs in the form of historical warranty claim forms 102, manufacturing data sources 104, current warranty claim forms 114, selected parameters and instances 118, and a final inference 122.

Historical warranty claim forms 102 are historical records that include structured and unstructured data related to the field failure attributes of the manufactured product. Similarly, manufacturing data sources 104 include structured and unstructured data related to the manufacturing attributes of the manufactured product. Knowledge model generating module 106 processes the structured and the unstructured data included in historical warranty claim forms 102 and manufacturing data sources 104 and organizes the structured and the unstructured data, in accordance with a knowledge model structure (described in detail in conjunction with FIG. 2 and FIG. 5), to develop knowledge model 108. Conversion module 110 converts knowledge model 108 into Bayesian network 112.

Current warranty claims forms 114 are current records that include structured and unstructured data related to the field failure attributes of the manufactured product. Warranty claims analyzing module 116 processes the structured and unstructured data in current warranty claim forms 114. Further, warranty claims analyzing module 116 provides an interactive user interface to select one or more parameters and their corresponding instances. Selected parameters and instances 118 are provided as input evidence to inference generating module 120. Inference generating module 120 maps selected parameters and instances 118 on Bayesian network 112 and generates final inference 122 with regard to the root cause analysis of the failure.

In commercial transactions, a warranty implies an obligation that a manufactured product is as factually stated or legally implied by the seller, and often provides for a remedy such as repair or replacement in the event the manufactured product fails to meet the implied standard of quality and performance. In cases of failure, a warranty claim proceeding is initiated. A warranty claim form is an electronic document that includes important information related to the field failure of a manufactured product. The warranty claim form includes structured and unstructured data. The structured data is in accordance with a predefined format and schema and is primarily in the form of identification numbers and codes, dates, values, etc. Examples of structured data include, but are not limited to, Claim Form Details, Product Details, Part Details, Repair Details and Service Centre Details. The unstructured data is in the form of free-form text information. The warranty claim form provides one or more text fields to provide various comments and remarks. These comments or remarks constitute the unstructured data. Examples of unstructured data include, but are not limited to, data inputs through fields such as Customer Comments, Technician Comments, Action Taken by Technician, Claim Authorization Remarks, and General Remarks in the warranty claims form. It will be appreciated by a person ordinarily skilled in the art that the description of the warranty claim form, as given above, is exemplary and numerous modifications, changes, variations, substitutions and equivalents may be made without departing from the spirit of the present invention.

Historical warranty claim forms 102 and current warranty claim forms 114 are a collection of warranty claim forms. Historical warranty claim forms 102 are a collection of warranty claim forms included in the historical records. In various embodiments of the present invention, the historical records may span a period of the past few months, years or decades. Current warranty claim forms 114 are a collection of warranty claim forms that are included in the current records. In various embodiments of the present invention, the historical records may span a period of the past few days, weeks or months. It should be noted that the segregation of warranty claim forms into historical and current records is a matter of policy and may be decided, based on the requirements of an organization.

Manufacturing data sources 104 include a plurality of sources that provide information related to manufacturing processes and materials, as well as to the tools and machines used during various manufacturing processes and activities. Examples of manufacturing data sources 104 include, but are not limited to, Manufacturing Execution System (MES), Check Sheets, Manufacturing Reports, and Raw Manufacturing Signals. Like warranty claim forms, manufacturing data sources 104 provide information in the form of structured and unstructured data.

Knowledge model generating module 106 processes the structured and the unstructured data included in historical warranty claim forms 102 and manufacturing data sources 104. Knowledge model generating module 106 extracts the structured data, in accordance with the predefined schemas. Further, knowledge model generating module 106 extracts unstructured data through a natural language-processing technique, i.e., the text-tagging and annotation techniques. Subsequently, knowledge model generating module 106 organizes the structured and the unstructured data related to the field-failure and manufacturing attributes, in accordance with a knowledge model structure (described in detail in conjunction with FIG. 2 and FIG. 5), to develop knowledge model 108.

Knowledge model 108 is a network of entities related to the field-failure and manufacturing attributes. Each entity in knowledge model 108 represents an instance of a parameter that is related to one of the field failure and manufacturing attributes. The entities are connected in a cause-and-effect relationship.

Conversion module 110 converts knowledge model 108 to Bayesian network 112. Each node of Bayesian network 112 represents an entity of knowledge model 108 and includes an objective value attribute. This objective value attribute denotes the conditional probability of the occurrence of the entity, based on historical records and the opinion of industry experts.

Warranty claim analyzing module 116 processes current warranty claim forms 114 and stores the structured and unstructured data in a field data warehouse (not shown in the figure). Warranty claim analyzing module 116 provides an interactive user interface through which the field data warehouse may be queried by using the multi-parameter drill-through and parameter recall-and-display techniques. The list of parameters includes, but is not limited to, warranty claim type, defect description, mileage in kilometers or miles (if the manufactured product is an automobile), date of manufacture, model description, and supplier location. One or more parameters and corresponding instances may be selected in a step-by-step manner. Selected parameters and instances 118 are provided as input evidence to inference generating module 120.

Inference generating module 120 maps selected parameters and instances 118 on Bayesian network 112 and generates final inference 122 with regard to the root cause analysis of the failure through a stage-wise inference build up. In one embodiment of the present invention, a user utilizes an interactive user interface to select the most relevant instance of the cause of the failure of the manufactured product, based on users' judgment.

While the present invention will hereinafter be explained in conjunction with the automotive industry, various embodiments of the present invention are applicable to several other industries such as in the field of retail and consumer products, communications, insurance and healthcare, financial services and banking. Further, in addition to the root cause analysis of the failure of a manufactured product, various embodiments of the present invention may be applied with slight modifications to such processes as in-house quality and defect management, warranty-recall forecasting, customer data management, sales forecasting, operations planning, product selection, product portfolio rationalization, project management and warehousing and distribution in the manufacturing and supply chain management space.

Figure 2:
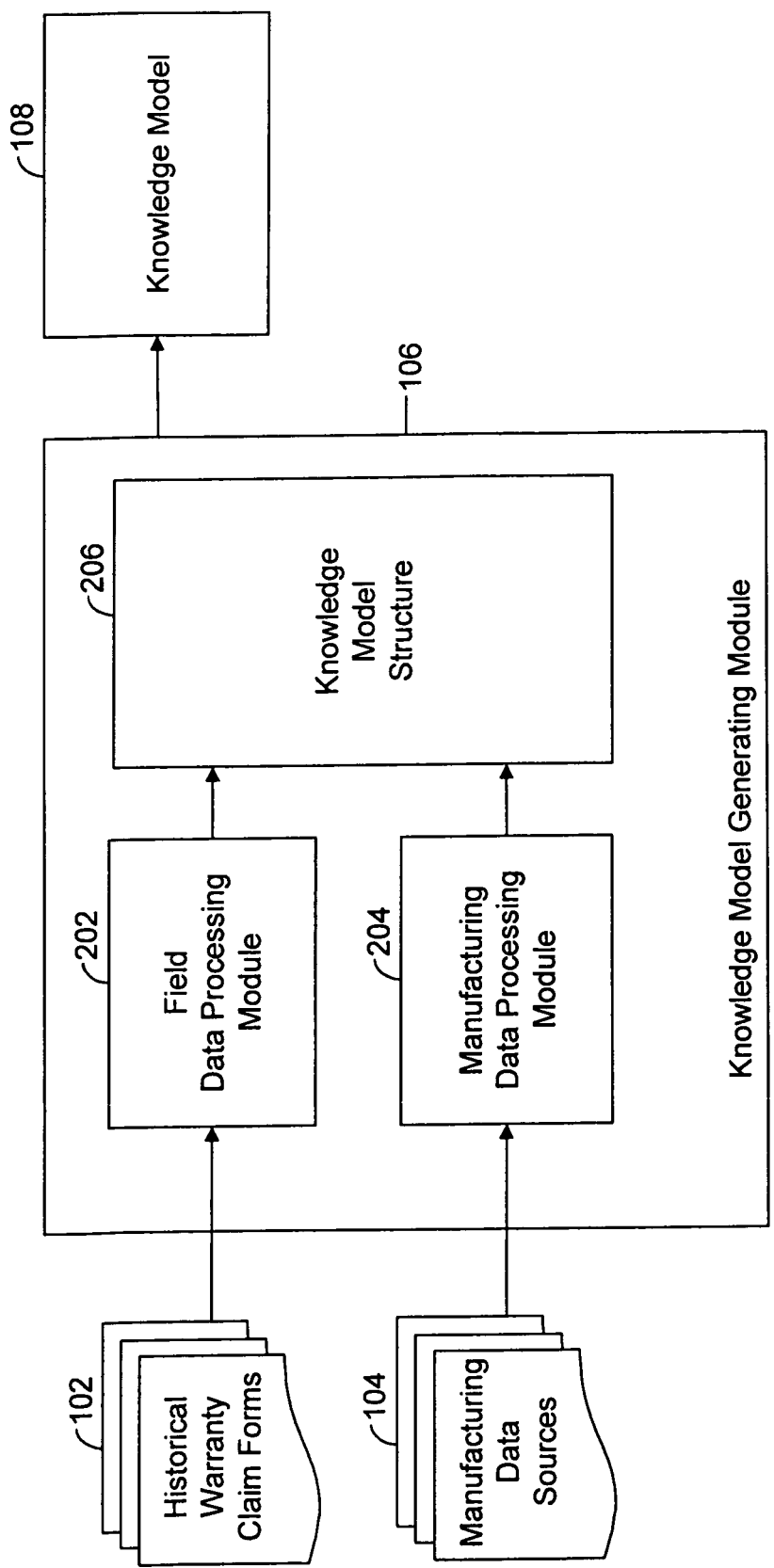
FIG. 2 is a block diagram depicting the development of a knowledge model, in accordance with an embodiment of the present invention.

FIG. 2 is a block diagram depicting the development of knowledge model 108, in accordance with an embodiment of the present invention. FIG. 2 includes historical warranty claim forms 102, manufacturing data sources 104, knowledge model generating module 106, and knowledge model 108. Knowledge model generating module 106 includes a field data processing module 202, a manufacturing data-processing module 204, and a knowledge model structure 206.

As discussed in conjunction with FIG. 1, historical warranty claim forms 102 includes structured and unstructured data related to field failure information. Similarly, manufacturing data source 104 includes structured and unstructured data related to manufacturing processes and information on materials.

Field data processing module 202 processes field failure information extracted from historical warranty claim forms 102. Similarly, manufacturing data processing module 204 processes manufacturing information extracted from manufacturing data sources 104.

Knowledge model structure 206 provides a template to organize field failure information and manufacturing information. Knowledge model structure 206 defines the classes and sub-classes related to field failure as well as manufacturing processes and materials. In an embodiment of the present invention, the classes related to field failure information are the Component Condition, the Defect Detail, the Related Part, and the Related Part Condition. The defect-detail class has two sub-classes namely, Manufacturing and External Factors. Similarly, the classes related to manufacturing information are the Process Material, the Activity, the Main Problem, and the Reason. The Main-problem class has three sub-classes namely the Operator, the Tool and the Machine. Knowledge model structure 206 has been described in detail in conjunction with FIG. 5.

Knowledge model generating module 106 organizes the structured and unstructured data extracted from field failure and manufacturing information, in accordance with knowledge model structure 206, to generate knowledge model 108. Knowledge model generating module 106 instantiates various classes and subclasses of knowledge model structure 206 by using the data extracted from the field failure and manufacturing information. Knowledge model 108 is therefore based on a structured causal relationship. In various embodiments of the present invention, any knowledge modeling tool known in the art may be used. Examples of knowledge modeling tools include, but are not limited to, the Protege open source tool, a modeling tool based on Web Object Language (OWL), etc.

Each instance of a class and a sub-class is provided a name, in accordance with a predefined nomenclature scheme. The nomenclature scheme comprises a class name abbreviation, a class uniqueness definer, and a class content name. For example, the nomenclature of an instance related to 'venting improper problem' in a 'casting die', belonging to a class 'Main Problem' and a sub-class 'Tool', is defined as: 'MPT_casting_die_venting_improper' {class name abbreviation+class content name}. If a number of casting dies are involved, the 'venting improper problem' in a 'casting die', which is a 'compressor back_plate casting die', is defined as 'MPT_compressor_back_plate_casting_die_venting_improper' {class name abbreviation+class uniqueness definer+class content name}.

The classes and sub-classes include properties known as slots. These slots provide further information about the classes and sub-classes. Examples of the slots include, but not limited to, constraints, a CPT frame, a CPT string, and a NULL PAR. For example, information provided by the slot 'constraint' that corresponds to the class 'Hose Discharge' denotes the constraints for each instance of the class 'Hose Discharge'.

Figure 3:
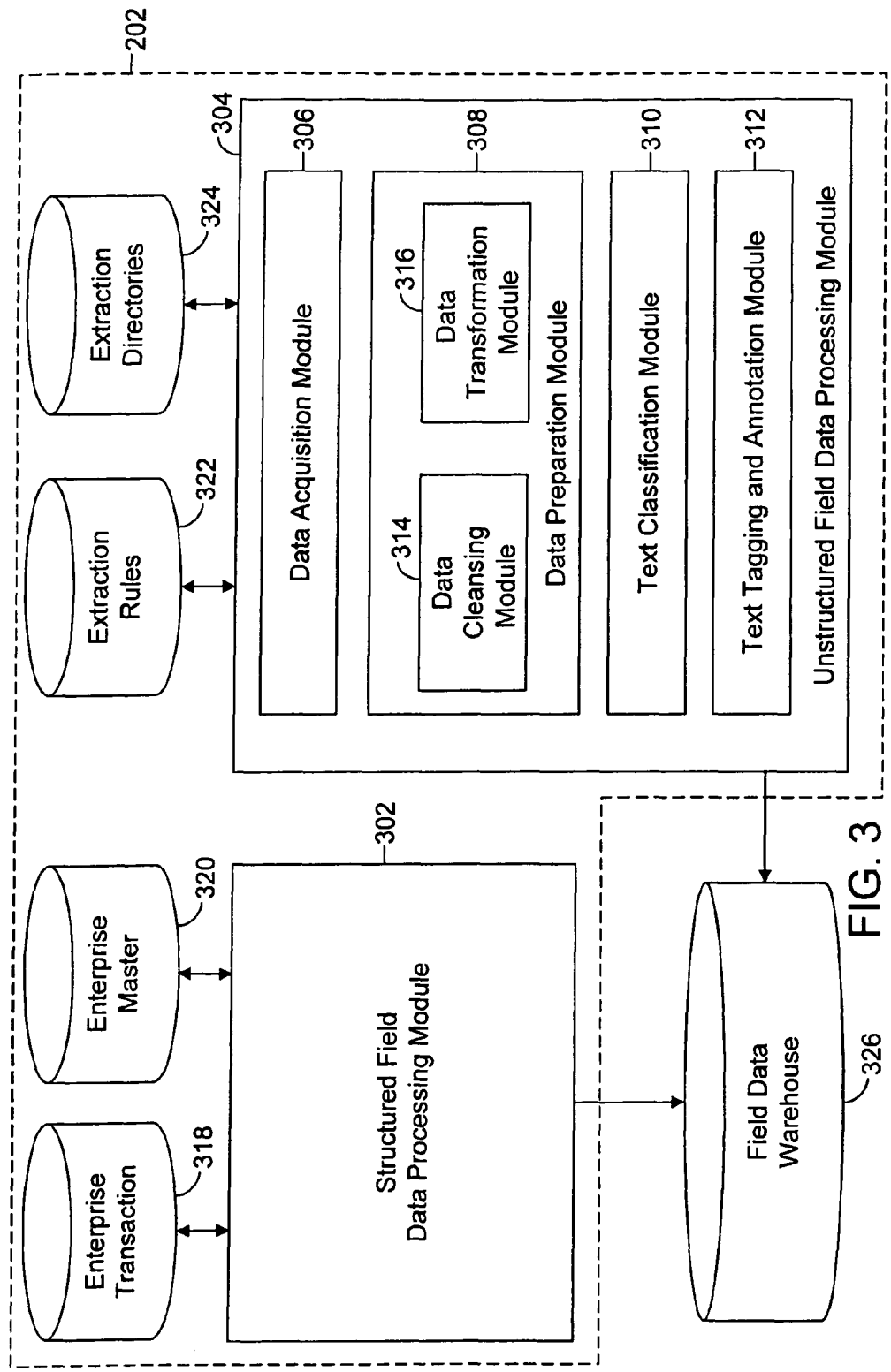
FIG. 3 is a block diagram depicting a field data-processing module, in accordance with an embodiment of the present invention.

FIG. 3 is a block diagram depicting field data processing module 202, in accordance with an embodiment of the present invention. Field data processing module 202 includes a structured field data processing module 302 and an unstructured field data processing module 304. Unstructured field data processing module 304 includes a data acquisition module 306, a data preparation module 308, a text classification module 310, and a text-tagging and annotation module 312. Data preparation module 308 includes a data cleansing module 314 and a data transformation module 316. Field data processing module 202 also includes an enterprise transaction database 318, an enterprise master database 320, an extraction rules database 322, and an extraction directories database 324. FIG. 3 also shows a field data warehouse 326.

Structured field data processing module 302 extracts the structured data related to the field failure information included in historical warranty claim forms 102. Structured field data processing module 302 extracts the structured data, based on the information available through enterprise transaction database 318 and enterprise master database 320. Examples of the data included in enterprise transaction database 318 include, but are not limited to, parts receipt data, vehicle production data, vehicle sales data, and engineering change data. Examples of the data included in enterprise master database 320 include, but are not limited to, the supplier master, the parts master, the vehicle master, the dealer master, the labor code list, the defect code list, and the bill of material.

Unstructured field data processing module 304 extracts the unstructured data related to the field failure information included in historical warranty claim forms 102, based on the information available through extraction rules database 322 and extraction directories database 324.

Data acquisition module 306 extracts relevant data from the historical warranty claim forms 102. In accordance with various embodiments of the present invention, the textual data in historical warranty claim forms 102 may reside in one or more of the sources, a relational database management system (RDBMS), a content management system (CMS), an XML database management system, or a file system. Data acquisition module 306 is capable of handling heterogeneous data sources. The data extracted by the data acquisition module 306 is in free-form text and is provided as an input to data preparation module 308.

Data preparation module 308 comprises data cleansing module 314 and data transformation module 316. Data cleansing module 314 cleanses data, which implies rectification of missing information, incorrect values, inconsistent values and spelling mistakes. For example, data cleansing module 314 identifies "Condesner" as an incorrectly spelled entry for the word "Condenser", and automatically corrects the spelling. Further, a warranty claim form may contain several abbreviations and acronyms that are frequently used by technicians or service stations. These abbreviations and acronyms are frequently used by professionals in a specific industry but are not part of the standard natural language. Data transformation module 316 transforms such abbreviations and acronyms into the standard natural language. For example, the entries, (1) "A/C n/w", (2) "aircon not wrk", and (3) "aircond not wrkg", are automatically transformed into "air-conditioner not working" by data transformation module 316. The data, after being cleansed and transformed, is provided as an input to text classification module 310.

Text-classification module 310 and the text-tagging and annotation module 312 transform the free-form text into an annotated structured format by using named entities. The transformed structured format is known as annotated structured information. In the context of warranty claim form analysis, the named entities include defect, condition, reason, related part, effect of defect, action, effect of action, etc. In a more general context, the named entities could include proper nouns (person names, product names, organization names, location names, etc.), temporal entities (time, dates, day, week, month and year), numerical entities (measurements, percentages, monetary values and quantity), and etc. Various rules and other information related to the extraction of annotated structured information from free-form text are included in extraction rules database 322 and extraction directories database 324. For example, a free-form text message, 'Adjusted belt of AC system with feathering to reduce noise', may be transformed into annotated structured data, Action-> "adjusted"; Part->"belt"; Reason->"feathering"; Location-> "air-conditioner system"; and Effect of Action->"reduce noise". It will be appreciated by persons ordinarily skilled in the art that the information included in extraction rules database 322 and extraction directories database 324 is domain-specific and will vary depending on the implementation of the present invention in a specific industry.

The structured and annotated structured data are stored in field data warehouse 326.

Figure 4:
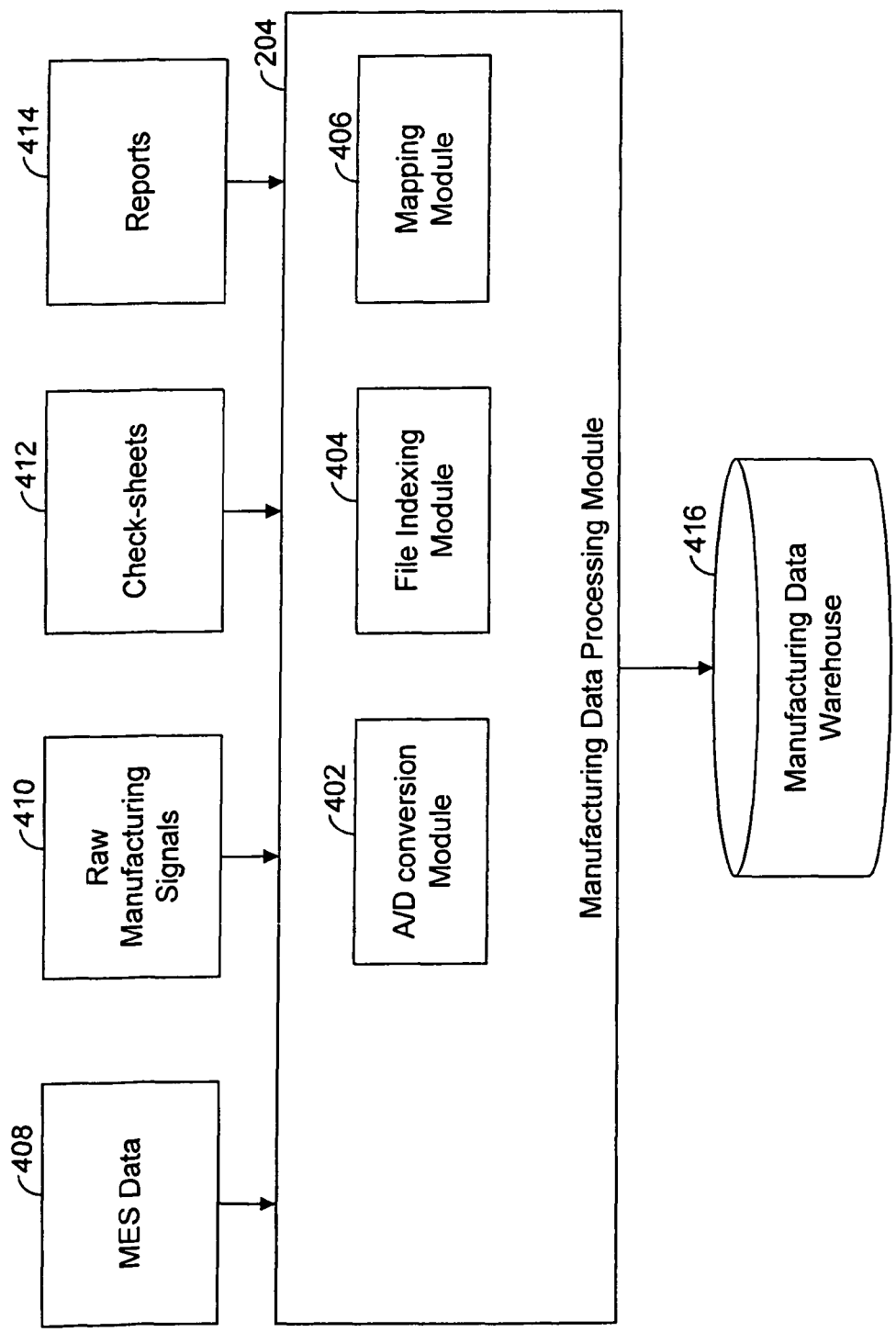
FIG. 4 is a block diagram depicting a manufacturing data-processing module, in accordance with an embodiment of the present invention.

FIG. 4 is a block diagram depicting a manufacturing data processing module 204, in accordance with an embodiment of the present invention. Manufacturing data processing module 204 consists of an A/D conversion module 402, a file-indexing module 404, and a mapping module 406. FIG. 4 shows various manufacturing data sources that include a manufacturing execution system (MES) 408, a set of raw manufacturing signals 410, check sheets 412, and reports 414. FIG. 4 also shows a manufacturing data warehouse 416.

Manufacturing data processing module 204 processes data obtained from various manufacturing data sources, i.e., manufacturing execution system (MES) 408, raw manufacturing signals 410, check sheets 412 and reports 414.

MES data 408 is processed by manufacturing data processing module 204 to extract information related to various manufacturing process and activities pertaining to various sub-parts of a manufactured product. MES data 408 is sorted for the parts, processes, activities and variations of specifications or control limits. The sorted MES data is stored in manufacturing data warehouse 416. Manufacturing data processing module 204 identifies a defective process, based on the extent of its deviation from normal specifications. Further, manufacturing data processing module 204 identifies a type of defect in the defective process.

Raw manufacturing signals 410 are processed by A/D conversion module 402. The data obtained from the A/D conversion module 402 is processed by manufacturing data processing module 204 and stored in manufacturing data warehouse 416. This data is aggregated, based on the product, the manufacturing processes, the possible defects in the manufacturing processes, and the possible sources of the defects in the manufacturing processes.

Check sheets 412 are generated during the various stages of the manufacturing process and the final inspection of the manufactured products. Check sheets 412 are available in the form of digital files or physical documents that are converted to digital images and are indexed, based on the keywords in the file indexing module 404. Indexing of the data is based on such dimensions as the product, the manufacturing processes, the possible defects in the manufacturing processes, and the possible sources of the defects in the manufacturing processes. The data obtained from file-indexing module 404 is stored in manufacturing data warehouse 416.

Reports 414 include various kinds of reports that are generated during the manufacturing process and over the life cycle of the product, for example, corrective action reports. Corrective action reports include detailed information related to failure, corresponding causes, and the remedial action taken. Examples of the information included in corrective action reports include, but are not limited to, the report identification number, part details, supplier details, defect details, associated part details, associated part condition details, the processes, the activity, the problem reported, the simulation tests, the root cause, and the standardization.

Mapping module 406 extracts various data points in the corrective action reports, based on various classes and sub-classes in the knowledge model structure. For example, 'part detail' corresponds to 'component', 'defect detail' corresponds to 'defect detail', 'associated part detail' corresponds to 'related part', etc. Mapping module 406 also assigns a unique identification code for each prime entity of knowledge model 108, which is defined by a primary key that corresponds to the entity, and a set of secondary keys that corresponds to an array of parent entities of the prime entity, for example, corresponding to a node of the knowledge model with the unique identification code as "PD_A/C_not_working_0.27", the primary key defined as "A/C not working", and the secondary key defined as "thermistor wire". Subsequently, reports 414 are also indexed by using file-indexing module 404, and the data obtained from file-indexing module 404 is stored in manufacturing data warehouse 416.

Figure 5:
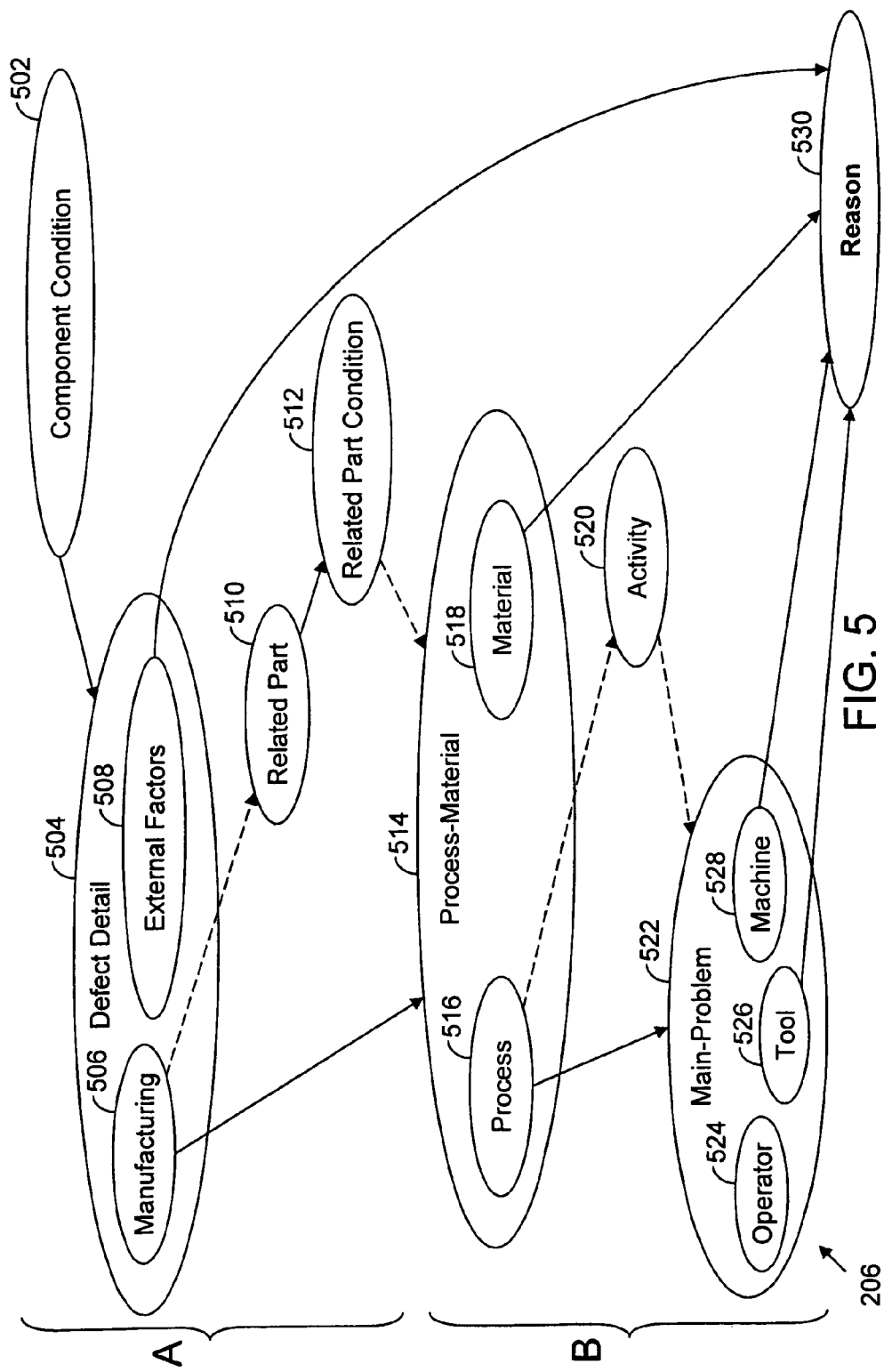
FIG. 5 is a block diagram depicting a knowledge model structure, in accordance with an embodiment of the present invention.

FIG. 5 is a block diagram depicting knowledge model structure 206, in accordance with an embodiment of the present invention.

As discussed in conjunction with FIG. 2, knowledge model structure 206 defines the classes and sub-classes related to field failure and manufacturing processes and materials. In an embodiment of the present invention, the classes and sub-classes related to field failure information are the Component Condition, the Defect Detail, the Related Part, and the Related Part Condition (labeled as A in the figure). Similarly, the classes and sub-classes related to manufacturing information are the Process Material, the Activity, the Main Problem, and the Reason (labeled as B in the figure). The major attribute of the failure of the manufactured product form the classes. The sub-attributes of the failure of the manufactured product form the sub-classes. For example, 'defect-detail' is a class that represents the defect in the manufactured product, and 'manufacturing' and 'external factors' are two sub-classes of the class 'defect-detail'. The sub-class, 'manufacturing', represents the failures that are the result of defects in the manufacturing processes or materials, and the sub-class 'external factors' represent the failures that are caused by external factors such as external environment inclemency and improper customer usage. The classes and sub-classes are organized in a hierarchy that follows a parent-and-child paradigm. The arrows in the figure denote the parent-child relationship between the classes and sub-classes, with the origination class/sub-class being the parent and the termination class/sub-class being the child. A bold arrow denotes a mandatory relationship, whereas a dotted arrow denotes an optional relationship.

One or more of the classes and sub-classes may be an abstract class. An abstract class does not have a corresponding instance. For example, 'Early Warning' is an abstract class, which includes one or more sub-classes that may be related to an actual instance. A concrete class may be related to an actual instance. For example, 'activity' is a concrete class since it denotes a manufacturing activity.

As shown in FIG. 5, the classes and sub-classes related to field failure information include component condition 502, defect detail 504, related part 510, and related part condition 512.

Component condition 502 is the highest level class in the hierarchy of knowledge model structure 206. An instance of component condition 502 represents information related to a component of the manufactured product and the condition of the component. For example, an instance such as "CC_Cooling_unit_case_crack" denotes the 'crack of cooling unit case'.

Defect detail 504 is the next level class in the hierarchy of knowledge model structure 206 and is the child class of the component condition 502. Defect detail 504 includes two sub-classes, i.e., manufacturing 506 and external factors 508. Manufacturing 506 represents the failures that are caused by defects in the manufacturing processes or materials. External factors 508 represent the failures that are caused by external factors such as external environment inclemency and improper customer usage.

Related part 510 is the next level class in the hierarchy of knowledge model structure 206 and child of manufacturing 510. Related part 510 represents failure in the field, caused by a related part 510. Related part 510 is an optional class.

Related part condition 512 is the next class in the hierarchy of knowledge model structure 206 and a child of related part 510. Related part condition 512 represents a condition of the related part that is responsible for field failure of the manufactured product. If related part 510 exists, related part condition 512 also necessarily exists. If related part 510 does not exist, related part condition 512 also does not exist.

Process material 514 is the next level class in the hierarchy of the knowledge model structure 206 and the child of either manufacturing 506 or related part condition 512. Process material 514 includes two sub-classes, i.e., process 516 and material 518. Process 516 represents the process involved in manufacturing the component, for example, casting, forging, machining, heat treatment, assembly, etc. Material 518 represents the material used in manufacturing the component, for example, spring steel, cast iron, rubber, or aluminum-silicon alloy.

Activity 520 is the next level class in the hierarchy of knowledge model structure 206 and the child of process 516. Activity 520 represents an activity of the manufacturing process that is responsible for the failure in the field, for example, degreasing, rinsing, pickling, phosphating, plating, etc. Activity 520 is an optional class.

Main problem 522 is the next level class in the hierarchy of knowledge model structure 206 and the child of process 516 or activity 520. Main problem 522 includes three sub-classes, that is, operator 524, tool 526 and machine 528. Operator 524 represents the problems caused by the faulty operation that is attributed to the mishandling or negligence of the operator. Tool 526 represents problems caused by faulty tools used to manufacture the components. Machine 528 represents machine-related problems that result in defects in the components.

Reason 530 is the lowest class in the knowledge model structure 206 and the child of external factors 508, material 518, tool 526, and machine 528. Reason 530 denotes the root cause of the defect that is responsible for the failure of the manufactured product in the field.

The field failure information included in the warranty claim forms provide instances that correspond to higher order classes (labeled as A in the figure). The higher order classes include component condition 502, defect detail 504, manufacturing 506, external factors 508, related part 510, and related part condition 512. The manufacturing information included in various manufacturing data sources, for example, corrective action reports, provide instances that correspond to lower order classes (labeled as B in the figure). These lower order classes include process material 514, process 516, material 518, activity 520, main problem 522, operator 524, tool 526, machine 528, and reason 530.

One or more instances included in knowledge model 108 have multiple parents or children. For example, insufficient electricity in a plating tank is a machine-related problem in manufacturing. This is caused by either (1) improper current calibration or (2) improper functioning of the voltage stabilizer. Since less current in the plating tank is a machine-related problem, it is an instance of machine 528 and is known as "MPM_Plating_tank_current_less". The two possible causes for this problem include instances of reason 530. These are known as "R_Current_calibration_improper" and "R_Voltage_stabilizer_not_working". The causal relationship is manifested as a parent-child relationship in knowledge model 108.

Figure 6:
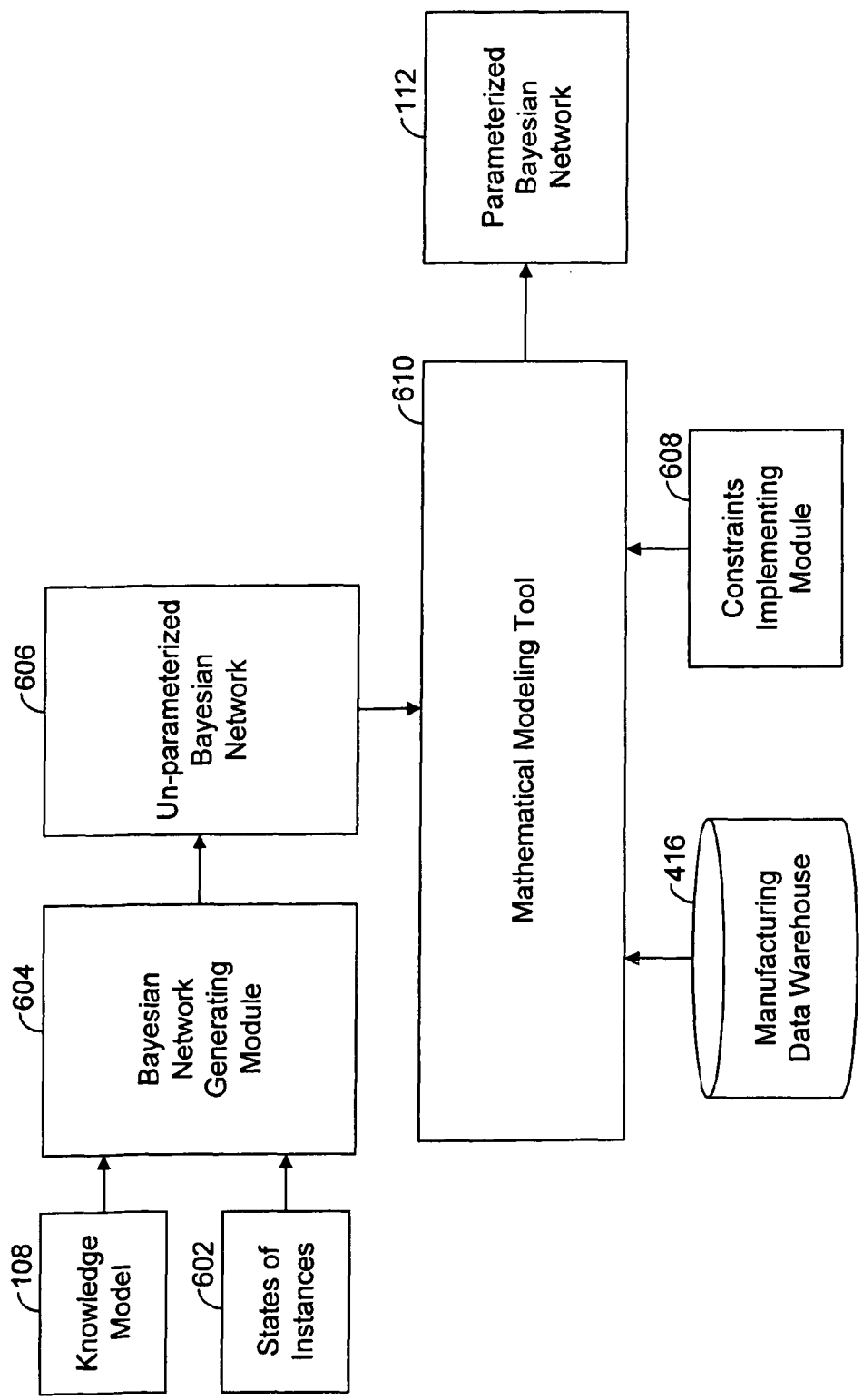
FIG. 6 is a block diagram depicting the conversion of the knowledge model to a Bayesian network, in accordance with an embodiment of the present invention.

FIG. 6 is a block diagram depicting the conversion of knowledge model 108 to Bayesian network 112, in accordance with an embodiment of the present invention.

Conversion module 110 (described in conjunction with FIG. 1) includes a Bayesian network generating module 604, a mathematical modeling tool 610, and a constraints-implementing module 608. FIG. 6 also shows knowledge model 108, a states of instances 602, un-parameterized Bayesian network 606, manufacturing data warehouse 416, and parameterized Bayesian network 112.

As described in conjunction with FIG. 1 through 5, knowledge model 108 is a network of entities that are related to the field failure and manufacturing attributes. Each entity in knowledge model 108 represents an instance of a parameter that is related to one of the field failure and manufacturing attributes. The entities are connected in a parent-and-child relationship.

Each instance of the knowledge model may be associated with a number of states. For example, for an instance, 'RPC_cooling_jacket_temperature_abnormal', the state of the instances may be low, normal or high.

The states of instances 602 represent the states an instance may assume and a corresponding conditional probability table. As discussed above, an instance may be defined to assume 'n' states (where $n \geq 2$ and n belongs to the set of natural numbers). The number of states of an instance, as well as the number of states of each of the parent instances of the instance, defines a conditional probability table (CPT) associated with the instance. In one embodiment of the present invention, each instance is defined to assume two states, True and False (Boolean format). In this scheme, if an instance has 'x' number of parent instances, the associated CPT has $2^x$ dimensions, i.e., $2^x$ probability values need to be populated in the CPT. It should be noted that any probability distribution format is applicable to various embodiments of the present invention, and the states of each instance of the knowledge model is assumed to be in a Boolean format, only for exemplary purposes.

Bayesian network generating module 604 takes two inputs, (1) knowledge model 108 and (2) states of instances 602, and integrates the two inputs to generate an un-parameterized Bayesian network 606. Each entity of knowledge model 108 corresponds to a node in un-parameterized Bayesian network 606. The detailed nomenclature scheme used in knowledge model 108 is used to provide a unique identification number to each node of un-parameterized Bayesian network 606.

Un-parameterized Bayesian network 606 has various instances that are connected in a parent-child network, and each instance is associated with a corresponding conditional probability table. In un-parameterized Bayesian network 606, the conditional probability tables of various instances are not populated. In an embodiment of the present invention, un-parameterized Bayesian network 606 is in a Bayesian Intermediate Format (*.bif).

Mathematical modeling tool 610 converts un-parameterized Bayesian network 606 into parameterized Bayesian network 112. (It should be noted that parameterized Bayesian network 112 is the same as Bayesian network 112 described in conjunction with FIG. 1). Examples of mathematical modeling tool 608 include, but not limited to, the MATLAB BNT tool, the MSBN tool, etc. In one embodiment of the present invention, parameterized Bayesian network 112 resides in the MATLAB environment. Mathematical modeling tool 610 takes inputs from manufacturing data warehouse 416 and constraints implementing module 608.

Manufacturing data warehouse 416 provides posterior probabilities in the conditional probability table. For example, the conditional probability (CP-1) that "MPM_Plating_tank_current_less" will occur, given that "R_Current_calibration_improper" is true and "R_Voltage_stabilizer_not_working" is also true, may be calculated as 0.38, based on the historical data obtained from manufacturing data warehouse 416. Further, the conditional probability (CP-2) that "MPM_Plating_tank_current_less" will occur, given that "R_Current_calibration_improper" is false and "R_Voltage_stabilizer_not_working" is also true, may be calculated as 0.28, based on the historical data obtained from manufacturing data warehouse 416.

Constraints implementing module 608 includes the opinion of industry experts. The constraints are used to refine the probability values in the conditional probability tables of one or more instances. In one embodiment of the present invention, the probability values provided as constraints always override the probability values calculated from historical data that is obtained from manufacturing data warehouse 416. The constraints can also provide qualitative inputs restricting the values which can be adopted in a conditional probability table. In an embodiment of the present invention, the constraints are provided as an *.xls format, which is later converted to a *.txt format by using a Perl script.

In the example above, if an expert has past experience that the probability that "plating tank current less" will occur, given that the "voltage stabilizer is not working", it will always be the same, irrespective of whether the "current calibration is proper" or "current calibration is improper". The constraint provided by the expert modifies the values of the conditional probability (CP-1) in the CPT from 0.38 to 0.28.

Whenever the data from the manufacturing data warehouse and the constraints implementing module is not sufficient to populate one or more values in the CPT of an instance, mathematical modeling tool 610 uses a maximum likelihood estimation (MLE) algorithm to populate the missing values.

In various embodiments of the present invention, the learning of the knowledge model and its conversion to the Bayesian network is carried out at periodic intervals with updated data records and information.

Figure 7:
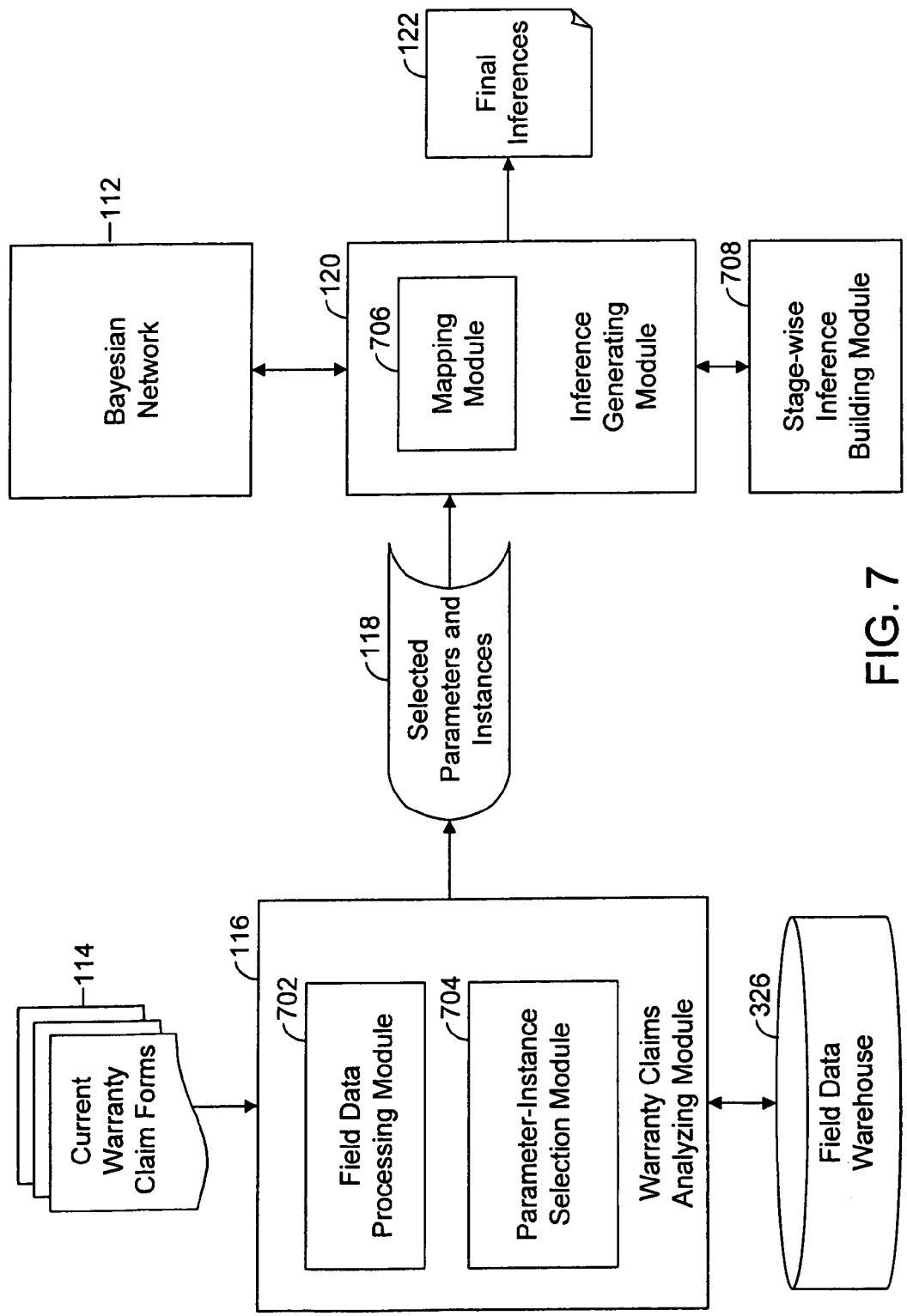
FIG. 7 is a block diagram depicting a stage-wise inference build-up to obtain the root cause of the failure of a manufactured product, in accordance with an embodiment of the present invention.

FIG. 7 is a block diagram depicting a stage-wise inference build up to obtain the root cause of the failure of a manufactured product, in accordance with an embodiment of the present invention. FIG. 7 shows Bayesian network 112, current warranty claim forms 114, warranty claims analyzing module 116, selected parameters and instances 118, inference generating module 120, a stage-wise inference building module 708, and final inferences 122. Warranty claims analyzing module 116 includes field data-processing module 702 and parameter-instance selection module 704. Inference-generating module includes a mapping module 706.

Warranty claims analyzing module 116 receives current warranty claim forms 114. As described in conjunction with FIG. 1, current warranty claim forms 114 is a collection of the warranty claim forms in the current records.

Field data processing module 702 is similar to field data processing module 202, described in conjunction with FIG. 2 and FIG. 3. Field data processing module 702 extracts the structured and unstructured data in current warranty claim forms 114 in a structured format, and stores the extracted data, which is hereinafter referred to as the combined structured data, in the field data warehouse 326.

Parameter-instance selection module 704 provides an interactive user interface through which field data warehouse 326 may be queried by using multi-parameter drill-through and parameter recall-and-display techniques to analyze the combined structured data of the current warranty claims forms 114. The structured information consists of a list of parameters and a corresponding list of instances. Parameter instance-selection module 704 includes a list of parameters that may be used for analysis. The list of parameters includes, but is not limited to, the warranty claim type, the defect description, mileage in kilometers or miles (in the event the manufactured product is an automobile), the date of manufacture, the model description, and the supplier location. One or more parameters and corresponding instances may be selected in a step-by-step manner. Selected parameters and instances 118 are provided as input evidence to inference-generating module 120. In accordance with an embodiment of the present invention, the user may cancel any of the selected parameters or set of instances at any stage during the analysis.

Mapping module 706 maps selected parameters and instances 118 on Bayesian network 112. Inference generating module 120 generates stage-wise inference with regard to the root cause analysis of a failure.

Stage-wise inference building module 708 provides an interactive user interface to select the most relevant instance of the cause of the failure of the manufactured product, based on the user's judgment at each stage. The number of stages is based on the level of hierarchy in knowledge model structure 206. An example of stage-wise inference build-up is explained with the help of the example below.

Stage 1 of Inference (material-process): These include the materials and processes involved in the failure of a manufactured product. The material is an "Al—Si alloy bracket" and the processes are "bracket-pressing" and "bracket-welding processes". The user selects the "bracket-pressing process" as the most likely process that is responsible for the failure of the manufactured product.

Stage-2 of Inference (activity): This includes the activity of the process involved in the failure of the manufactured product. A "heat treatment process" is divided into multiple activities such as "hardening", "quenching", and "tempering".

Stage 3 of Inference (main problem): this includes the problem in the process or activity involved in the failure of the manufactured product. The "bracket-pressing process" includes problems such as a "press tool with a sharp edge" with a probability of 0.64, a "press stroke setting that is inappropriate" and has a probability of 0.05, and the "higher tonnage press that is selected" that has a probability of 0.04. The user selects the "press tool with sharp edges" that has a probability of 0.64 as the most likely problem for the failure of the manufactured product.

Stage 4 of Inference (reason): Reason is the most granular level root cause involved in the failure of the manufactured product. The reasons for the "press tool with sharp edges" includes a "tool design that is inappropriate" and has a probability of 0.20, a "tool die matching that is improper" and has a probability of 0.29, a "tool clearance that is improper" and has a probability of 0.27, and a "tool wear out" that has probability of 0.24.

In this manner, the user obtains the root cause of the failure of the manufactured product, based on stage-wise inference-building module 708. Inference generating module 120 provides final inference 122 as the final output.

Figure 8:
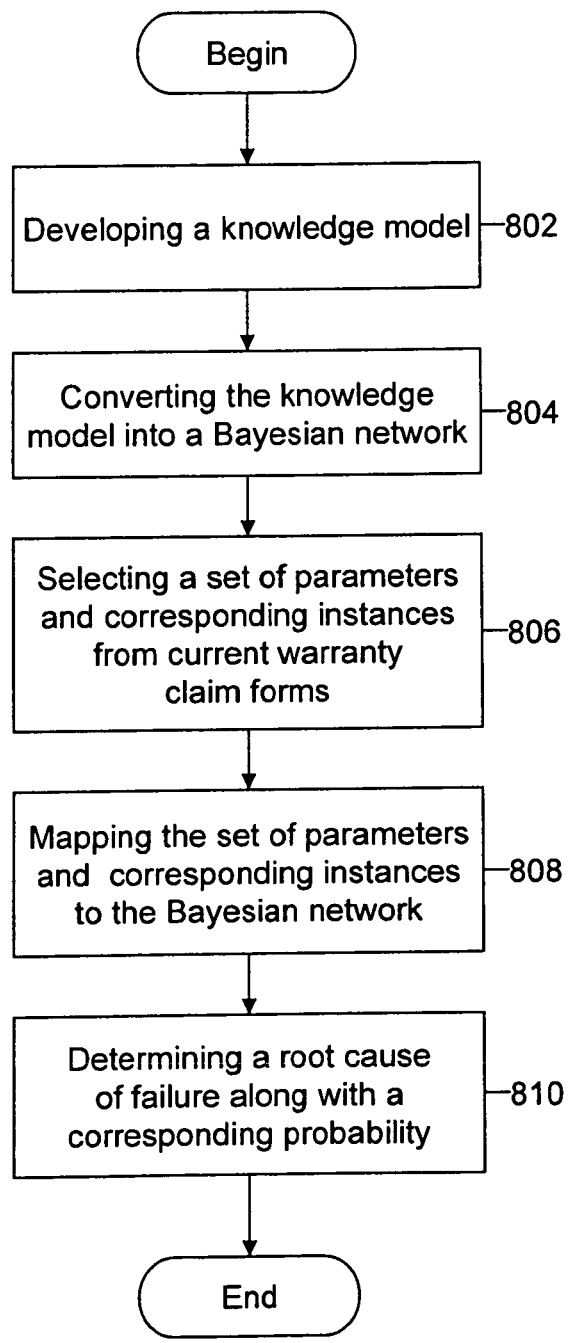
FIG. 8 is a flow chart depicting a method for the root cause analysis of the failure of a manufactured product, in accordance with an embodiment of the present invention.

FIG. 8 is a flow chart depicting a method for the root cause analysis of the failure of a manufactured product, in accordance with an embodiment of the present invention. The root cause analysis of the failure is performed to derive an inference in the form of the root causes of the failure of a manufactured product in the field and the corresponding probability of occurrence.

At step 802, a knowledge model is developed to perform the root cause analysis of the failure of the manufactured product. The knowledge model is developed, based on the structured and unstructured data, which is related to field failure and manufacturing information obtained from historical warranty claim forms and various manufacturing data sources.

As described in conjunction with FIG. 1 through 5, knowledge model 108 is a network of entities that is related to the field failure and manufacturing attributes. Each entity in knowledge model 108 represents an instance of a parameter related to one of the field failure and manufacturing attributes. The entities are connected in a parent-and-child relationship.

At step 804, the knowledge model is converted into a Bayesian network. Each node of the Bayesian network corresponds to an entity of the knowledge model and has an objective value attribute. This objective value attribute provides a conditional probability of the occurrence of the entity, based on historical records and the opinion of industry experts.

At step 806, a set of parameters and corresponding instances are selected from current warranty claim forms. The structured and unstructured data included in the current warranty claim forms is extracted. The unstructured data is transformed into annotated structured data through text-tagging and annotation techniques. The structured data and annotated structured data are stored in a field data warehouse. An interactive user interface is used to analyze the structured and annotated structured information of the current warranty claim forms. One or more parameters and corresponding instances are selected, based on a list of parameters. The list of parameters includes, but is not limited to, the warranty claim type, the defect description, mileage in kilometers or miles (in the event the manufactured product is an automobile), the date of manufacture, the model description, and the supplier location.

At step 808, the selected parameters and instances are mapped on the Bayesian network. An inference is generated, based on the stored parameters and instances and the Bayesian network. An interactive graphical user interface is used to iteratively select the most relevant instances of the cause of the failure of the manufactured product, based on the user's judgment at each stage. The number of stages of the stage-wise inference build up is based on the level of hierarchy of the knowledge model structure.

At step 810, a final inference with regard to the root cause of the failure of the manufactured product is generated.

Figure 9:
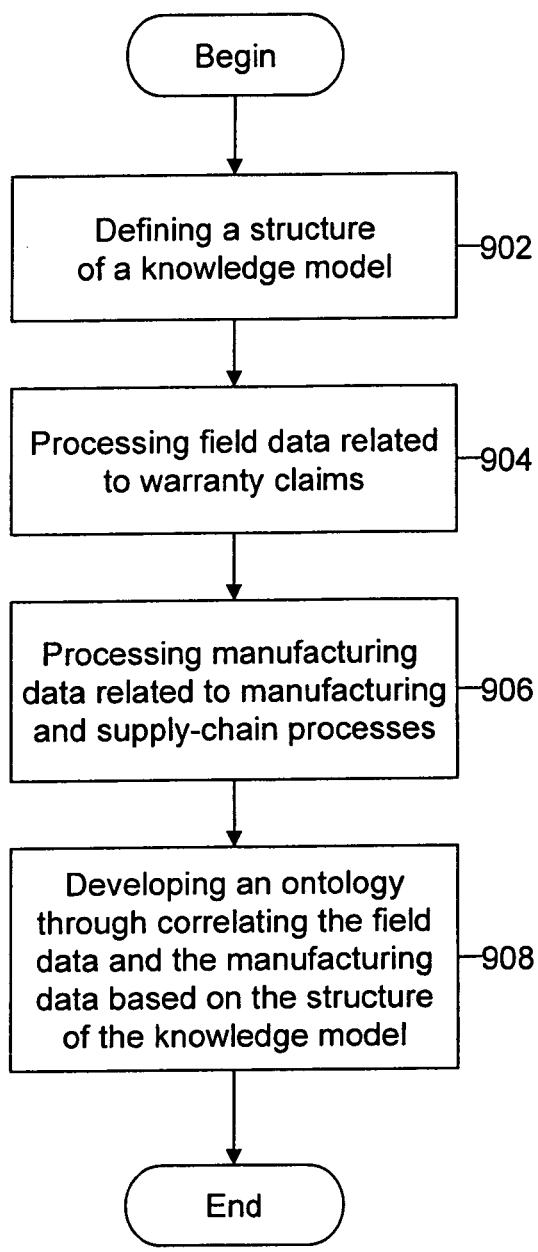
FIG. 9 is a flow chart depicting a method for developing the knowledge model, in accordance with an embodiment of the present invention.

FIG. 9 is a flow chart depicting a method for developing the knowledge model, in accordance with an embodiment of the present invention.

At step 902, a knowledge model structure is defined. This knowledge model structure is defined in the form of classes and sub-classes.

The knowledge model structure defines the classes and sub-classes related to field failure, as well as the manufacturing processes and materials. In one embodiment of the present invention, the classes and subclasses related to field failure information include the Component Condition, the Defect Detail, the Related Part, and the Related Part Condition. Similarly, the classes and sub-classes related to the manufacturing information include the Process Material, the Activity, the Main Problem, and the Reason. The major attribute of the failure of the manufactured product forms the classes. The sub-attributes of the failure of the manufactured product form the sub-classes.

At step 904, the historical warranty claim forms are processed to extract data related to field failure information. The historical warranty claim forms include structured and unstructured data. The structured data is processed, based on the information available through enterprise transaction database 318 and enterprise master database 320. Examples of data included in enterprise transaction database 318 include, but are not limited to, parts receipt data, vehicle production data, vehicle sales data, and engineering change data. Examples of data included in enterprise master database 320 include, but are not limited to, the supplier master, the parts master, the vehicle master, the dealer master, the labor code list, the defect code list, and the bill-of-material.

The unstructured data is processed by extracting relevant data from the historical warranty claim forms based on the information available through extraction rules database 322 and extraction directories database 324.

The relevant data is in natural language text or free-form text. The free-form text is cleansed, which implies rectification of missing information, incorrect values, inconsistent values and spelling mistakes. Further, a warranty claim form may contain several abbreviations and acronyms that are frequently used by technicians or service stations. These abbreviations and acronyms are used by professionals in a specific industry but are not part of the standard language. Such abbreviations and acronyms are transformed into standard language. Thereafter, the natural language text or free-form text is transformed into a structured format by text-tagging and the annotation technique. The text-tagging and annotation technique is utilized to transform the unstructured information into annotated structured information. The combined structured data and annotated structured data is stored in a field data warehouse.

At step 906, the manufacturing data related to manufacturing and the supply chain process is processed. Various sources of manufacturing data include, but are not limited to, the manufacturing execution system (MES), raw manufacturing signals, check sheets and reports.

MES data is processed to extract information related to various manufacturing processes and activities related to various sub-parts of a manufactured product. MES data is sorted for parts, processes, activities and variations related to specifications or control limits. The sorted MES data is stored in a manufacturing data warehouse. A defective process is identified, based on the extent of the deviation from a normal specification. Further, the type of defect in the defective process is also identified.

Raw manufacturing signals are processed by A/D conversion. The data thus obtained is processed and stored in the manufacturing data warehouse. Data is aggregated, based on the product, the manufacturing processes, the possible defects in the manufacturing processes, and the possible sources of the defects in the manufacturing processes.

Check sheets are generated during the various stages of the manufacturing process and the final inspection of the manufactured products. These check sheets are available in the form of digital files or physical documents that are converted to digital images. Check sheets are indexed based on the keywords. Indexing of data is based on such dimensions as the product, the manufacturing processes, the possible defects in the manufacturing processes, and the possible sources of the defects in the manufacturing processes. The data thus obtained is stored in the manufacturing data warehouse.

Reports include various kinds of reports that are generated during the manufacturing process and over the lifecycle of the product, for example, corrective action reports. These corrective action reports include detailed information relating to failure, corresponding causes, and the remedial action taken. Examples of the information included in corrective action reports include, but are not limited to, the report identification number, part details, supplier details, defect details, associated part details, associated part condition details, processes, activities, problems reported, root causes, and standardization.

At step 908, an ontology is developed by correlating the field data and the manufacturing data, based on the knowledge model structure. The structured and unstructured data extracted from the field failure and manufacturing information is organized in accordance with the knowledge model structure, to generate the knowledge model. Various classes and subclasses of the knowledge model structure are instantiated by using the data extracted from the field failure and manufacturing information. The knowledge model is thus based on a structured causal relationship. In various embodiments of the present invention, any knowledge modeling tool known in the art may be used. Examples of knowledge modeling tools include, but are not limited to, the Protege open source tool, a modeling tool based on the Web Object Language (OWL), etc.

Figure 10:
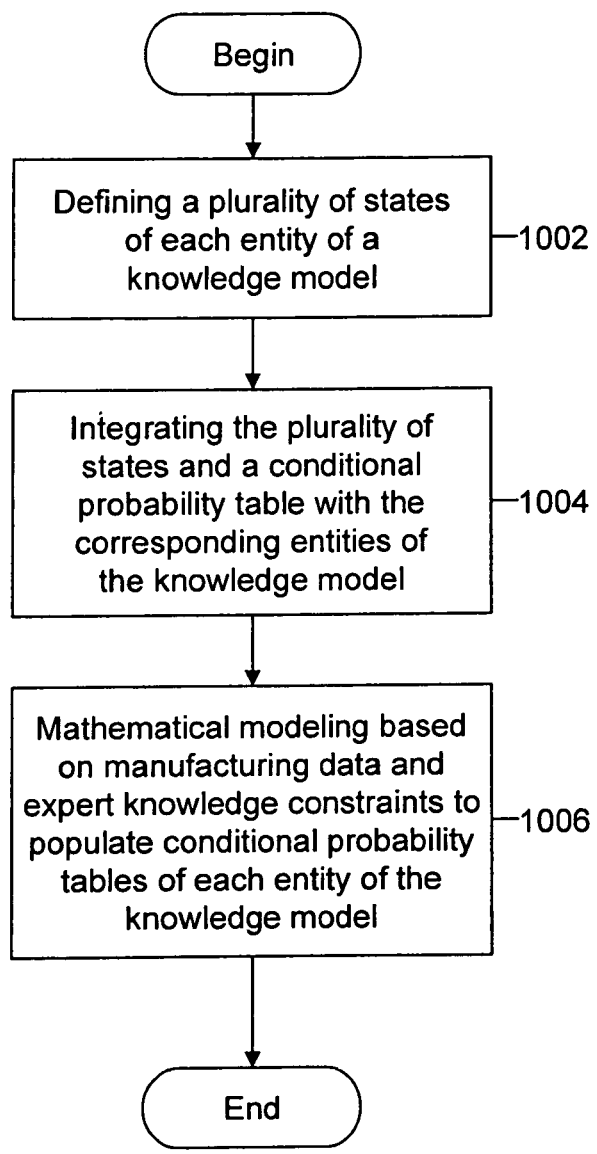
FIG. 10 is a flow chart depicting a method for converting the knowledge model to the Bayesian network, in accordance with an embodiment of the present invention.

FIG. 10 is a flow chart depicting a method for converting the knowledge model to the Bayesian network, in accordance with an embodiment of the present invention.

At step 1002, a plurality of states of each entity of the knowledge model is defined. Each entity of the knowledge model represents an instance in the knowledge model. As described in conjunction with FIG. 8, the knowledge model is a network of entities that are related to the field failure and manufacturing attributes. Each entity in the knowledge model represents an instance of a parameter that is related to one of the field failure and manufacturing attributes. The entities are connected in a parent-and-child relationship. Each instance of the knowledge model may be associated with a number of states. For example, for an instance, 'RPC_cooling_jacket_temperature_abnormal', the states of the instances may be low, normal, or high.

The states of the instances represent the states an instance may assume and a corresponding conditional probability table. As discussed above, an instance may be defined to assume 'n' states (where $n \geq 2$ and n belongs to the set of natural numbers). The number of states in an instance, as well as the number of states in each of the parent instances of the instance, defines a conditional probability table (CPT) that is associated with the instance. In one embodiment of the present invention, each instance is defined to assume two states, True and False (Boolean format). In this scheme, if an instance has 'x' number of parent instances, the associated CPT has $2^x$ dimensions, i.e., $2^x$ probability values need to be populated in the CPT. It should be noted that any probability distribution format is applicable to various embodiments of the present invention, and the states of each instance of the knowledge model is assumed to be in the Boolean format, only for exemplary purposes.

At step 1004, the plurality of states of instances and a conditional probability table are integrated with the corresponding entities of the knowledge model, to generate an un-parameterized Bayesian network. In the un-parameterized Bayesian network, the conditional probability tables of various instances are not populated.

At step 1006, the conditional probability tables are populated by mathematical modeling, based on data obtained from the manufacturing data warehouse and constraints developed through expert knowledge. Constraints represent the opinion of industry experts and are used to refine the probability values in the conditional probability tables of one or more instances. In one embodiment of the present invention, the probability values that are provided as constraints always override the probability values that are calculated from the historical data obtained from the manufacturing data warehouse.

Figure 11:
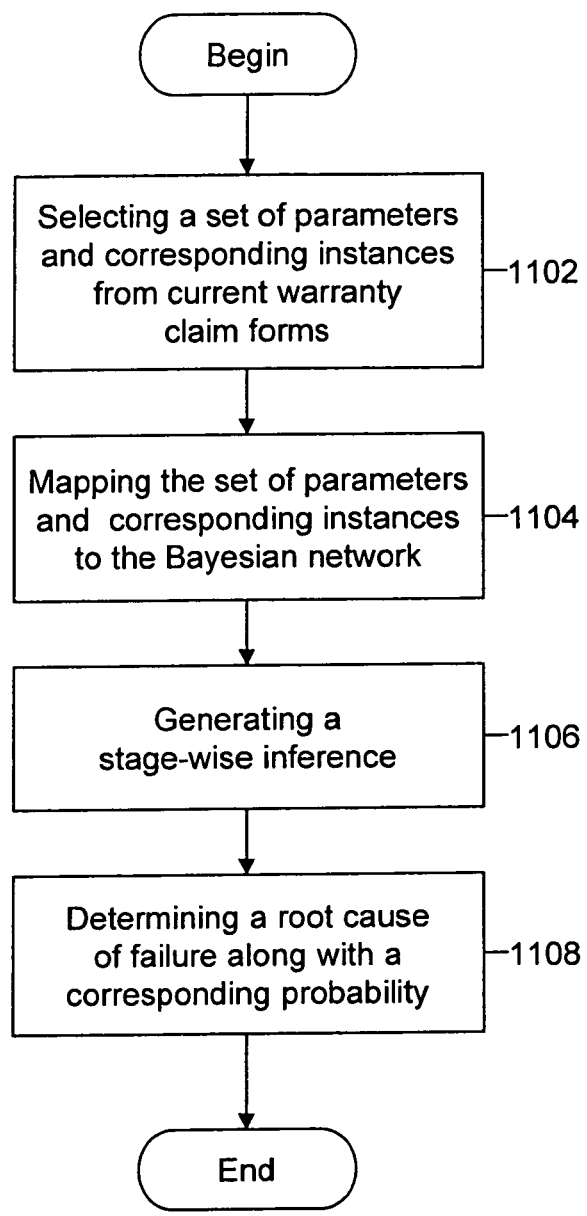
FIG. 11 is a flow chart depicting a method for a stage-wise inference build-up to obtain the root cause of the failure of a manufactured product, in accordance with an embodiment of the present invention.

FIG. 11 is a flow chart depicting a method for a stage-wise inference build-up to obtain the root cause of the failure of a manufactured product, in accordance with an embodiment of the present invention.

At step 1102, a set of parameters and corresponding instances are selected from the current warranty claim forms. These current warranty claim forms are processed to extract data related to field-failure information. The current warranty claim forms include structured and unstructured data. The structured data is processed, based on the information available through enterprise transaction database 318 and enterprise master database 320. Examples of the data in enterprise transaction database 318 include, but are not limited to, parts receipt data, vehicle production data, vehicle sales data, and engineering change data. Examples of the data included in enterprise master database 320 include, but are not limited to, the supplier master, the parts master, the vehicle master, the dealer master, the labor code list, the defect code list, and the bill-of-material.

The unstructured data is processed by extracting relevant data from the current warranty claim forms, based on the information available on extraction rules database 322 and extraction directories database 324. The relevant data is in natural language text or free-form text. The free-form text is cleansed, which implies rectification of missing information, incorrect values, inconsistent values and spelling mistakes. Further, a warranty claim form may contain several abbreviations and acronyms that are frequently used by technicians or service stations. These abbreviations and acronyms are used by professionals in a specific industry, but are not part of the standard language. Such abbreviations and acronyms are transformed into standard language. Thereafter, the natural language text or free-form text is transformed into a structured format by the text-tagging and annotation technique. The text-tagging and annotation technique is utilized to transform the unstructured information into annotated structured information. The combined structured data including field failure structured data and annotated structured data is stored in the field data warehouse.

An interactive user interface is used to query a field data warehouse by multi-parameter drill-through and parameter recall-and-display techniques to analyze the combined structured data of the current warranty claim forms. The structured information consists of a list of parameters and a corresponding list of instances. The list of parameters may be used for analysis. The list of parameters includes, but is not limited to, a warranty claim type, a defect description, mileage in kilometers or miles (in the event the manufactured product is an automobile), the date of manufacture, the model description, and the supplier location. One or more parameters and corresponding instances may be selected in a step-by-step manner. The selected parameters and instances are provided as input evidence to generate inferences. In accordance with an embodiment of the present invention, the user may cancel any of the selected parameters or the set of instances at any stage during the analysis.

At step 1104, the selected parameters and the corresponding instances are mapped on to the Bayesian network. An inference is generated, based on the stored parameters and instances and the Bayesian network.

At step 1106, an interactive graphical user interface is used to iteratively select the most relevant instance of the cause of the failure of the manufactured product, based on the user's judgment at each stage. The number of stages of the stage-wise inference build-up is based on the level of hierarchy of the knowledge model structure.

At step 1108, a final inference with regard to the root cause of the failure of the manufactured product is generated.

Various embodiments of the present invention provide a standardized system of leveraging knowledge to make accurate inferences with regard to the root causes for the failure of manufactured products. Further, the present invention provides improved techniques for capturing and analyzing structured and unstructured information related to the failure of manufactured products. The dependency on non-standardized and individual-based methods for root cause analysis is eliminated and detection of the root cause of failure becomes much faster and more accurate.

The system for root cause analysis of the failure of a manufactured product, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer also comprises a microprocessor, which is connected to a communication bus. Moreover, the computer includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system includes a communication unit, which enables the computer to connect to other databases and the Internet through an I/O interface. The communication unit enables the transfer and reception of data from other databases and may include a modem, an Ethernet card, or any similar device, which enables the computer system to connect to databases and networks such as LAN, MAN, WAN and the Internet. The computer system facilitates inputs from a user through the input device that is accessible to the system through an I/O interface.

The computer system executes a set of instructions that are stored in one or more storage elements to process input data. The storage elements may also hold data or other information, as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in the form of a collection of separate programs, a program module with a larger program, or a portion of a program module, as in the present invention. The software may also include modular programming in the form of object-oriented programming. The processing of input data by the processing machine may be in response to users' commands, the result of previous processing, or a request made by another processing machine.

While various embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. A method for root cause analysis of failure of a manufactured product, the method comprising the steps of:
   a. developing a knowledge model comprising a network of entities related to field of failure and manufacturing attributes of the manufactured product and interconnected in a cause-effect relationship, each entity comprising an instance of a parameter that is related to one of the field of failure and manufacturing attributes;
   b. converting the knowledge model into a Bayesian network, the Bayesian network comprising one or more nodes, each node representing an entity of the knowledge model along with a corresponding conditional probability of occurrence of the entity;
   c. selecting one or more parameters and corresponding instances from a set of failure reports
   d. mapping the one or more parameters and corresponding instances as a set of evidence to the Bayesian network; and
   e. determining a root cause of failure along with a corresponding conditional probability based on the set of evidence;
   wherein converting the knowledge model into the Bayesian network comprises associating each entity of the knowledge model with a plurality of states and each of the plurality of states with an objective value attribute;

each objective values attribute being associated with one or more values based on historical data and expert constraints using constraint optimization technique.

2. The method according to claim 1, wherein developing the knowledge model comprises processing at least one of structured data and unstructured data in a plurality of failure reports to generate a set of field failure attributes of the manufactured product.

3. The method according to claim 2, wherein the unstructured data is processed based on semantic parsing of the unstructured data into annotated structured data based on a set of extraction rules and a set of extraction directories.

4. The method according to claim 1, wherein developing the knowledge model comprises processing at least one of structured data and unstructured data related to manufacturing information to generate a set of manufacturing attributes of the manufactured product.

5. The method according to claim 1, wherein selecting one or more parameters and corresponding instances comprises processing at least one of structured data and unstructured data in the set of failure reports.

6. The method according to claim 1, wherein determining the root cause of failure is performed through a stage-wise inferences building technique comprising intuitive selection of an inference from one or more inferences of a first stage to generate one or more inferences of a second stage.

7. The method according to claim 1, wherein the Bayesian network is updated based on a predefined criterion.

8. A system for root cause analysis of failure of a manufactured product, the system comprising:
   a. a knowledge model comprising a network of entities related to field of failure and manufacturing attributes of the manufactured product and interconnected in a cause-effect relationship, each entity comprising an instance of a parameter that is related to one of the field of failure and manufacturing attributes;
   b. a conversion module, the conversion module converting the knowledge model into a Bayesian network, the Bayesian network comprising one or more nodes, each node representing an entity of the knowledge model along with a corresponding conditional probability of occurrence of the entity;
   c. a parameter-instance selection module, the parameter-instance selection module selecting a one or more parameters and corresponding instances from a set of failure reports;
   d. an inference generating module, the inference module configured for
      i. mapping the one or more parameters and corresponding instances as a set of evidence to the Bayesian network; and
      ii. determining a root cause of failure along with a corresponding conditional probability based on the set of evidence; and
   e. a first data processing module, the first data processing module processing at least one of structured data and unstructured data in a plurality of failure reports to generate a set of field failure attributes of the manufactured product, wherein the first data processing module comprises:
      i. a data preparation module, the data preparation module for cleansing and transforming the unstructured data based on a predefined criterion;
      ii. a text-classification module, the text-classification module for associating one or more parts of the unstructured data with a set of named entities; and
      iii. a text-tagging and annotation module, the text-tagging and annotation module for semantic parsing of the unstructured data into annotated structured data based on a set of extraction rules and a set of extraction directories.

9. The system according to claim 8 further comprising a second data processing module, the second data processing module for processing at least one of structured data and unstructured data related to manufacturing information to generate a set of manufacturing attributes of the manufactured product.

10. The system according to claim 8 further comprising a first interactive user interface, the first interactive user interface facilitating selection of the one or more parameters and corresponding instances.

11. The system according to claim 8 further comprising a second interactive user interface, the second interactive user interface facilitates a stage-wise inference building for determining the root cause of failure along with a corresponding conditional probability based on the set of evidence.

12. The system according to claim 8 further comprising a stage-wise inference building module, the stage-wise inference building module facilitating determination of the root cause of failure through a stage-wise inference building technique comprising intuitive selection of an inference from one or more inferences of a first stage to generate one or more inferences of a second stage.

13. The system according to claim 8, wherein the Bayesian network is updated based on a predefined criterion.

14. A computer program product for use with a computer, the computer program product comprising a non-transitory computer usable medium having a computer readable program code embodied therein for root cause analysis of failure of a manufactured product, the computer program code performing the steps of:
   a. developing a knowledge model comprising a network of entities related to field of failure and manufacturing attributes of the manufactured product and interconnected in a cause-effect relationship, each entity comprising an instance of a parameter that is related to one of the field of failure and manufacturing attributes;
   b. converting the knowledge model into a Bayesian network, the Bayesian network comprising one or more nodes, each node representing an entity of the knowledge model along with a corresponding conditional probability of occurrence of the entity, wherein converting the knowledge model into the Bayesian network comprises associating each entity of the knowledge model with a plurality of states and each of the plurality of states with an objective value attribute; each objective values attribute being associated with one or more values based on historical data and expert constraints using constraint optimization technique;
   c. selecting one or more parameters and corresponding instances from a set of failure reports;
   d. mapping the one or more parameters and corresponding instances as a set of evidence to the Bayesian network; and
   e. determining a root cause of failure along with a corresponding conditional probability based on the set of evidence.

15. The computer program product according to claim 14, wherein developing the knowledge model comprises processing at least one of structured data and unstructured data in a plurality of failure reports to generate a set of field failure attributes of the manufactured product.

16. The computer program product according to claim 15, wherein the unstructured data is processed based on semantic parsing of the unstructured data into annotated structured data based on a set of extraction rules and a set of extraction directories.

17. The computer program product according to claim 14, wherein developing the knowledge model comprises processing at least one of structured data and unstructured data related to manufacturing information to generate a set of manufacturing attributes of the manufactured product.

18. The computer program product according to claim 14, wherein selecting one or more parameters and corresponding instances comprises processing at least one of structured data and unstructured data in the set of failure reports.

19. The computer program product according to claim 14, wherein determining the root cause of failure is performed through a stage-wise inferences building technique comprising intuitive selection of an inference from one or more inferences of a first stage to generate one or more inferences of a second stage.

20. The computer program product according to claim 14, wherein the Bayesian network is updated based on a predefined criterion.

21. A system for root cause analysis of failure of a manufactured product, the system comprising:
 a. a knowledge model comprising a network of entities related to field of failure and manufacturing attributes of the manufactured product and interconnected in a cause-effect relationship, each entity comprising an instance of a parameter that is related to one of the field of failure and manufacturing attributes;
 b. a conversion module, the conversion module converting the knowledge model into a Bayesian network, the Bayesian network comprising one or more nodes, each node representing an entity of the knowledge model along with a corresponding conditional probability of occurrence of the entity, wherein the conversion module comprises:
  i. a Bayesian network generating module, the Bayesian network generating module for generating an un-parameterized Bayesian network, wherein each entity of the knowledge model is associated with a plurality of states and an objective value attribute corresponding to each of the plurality of states; and
  ii. a mathematical modeling tool, the mathematical modeling tool associating each objective value attribute with one or more values based on historical data and expert constraints using constraint optimization technique;
 c. a parameter-instance selection module, the parameter-instance selection module selecting a one or more parameters and corresponding instances from a set of failure reports; and
 d. an inference generating module, the inference module configured for
  i. mapping the one or more parameters and corresponding instances as a set of evidence to the Bayesian network; and
  ii. determining a root cause of failure along with a corresponding conditional probability based on the set of evidence.

* * * * *